Patented Apr. 14, 1953

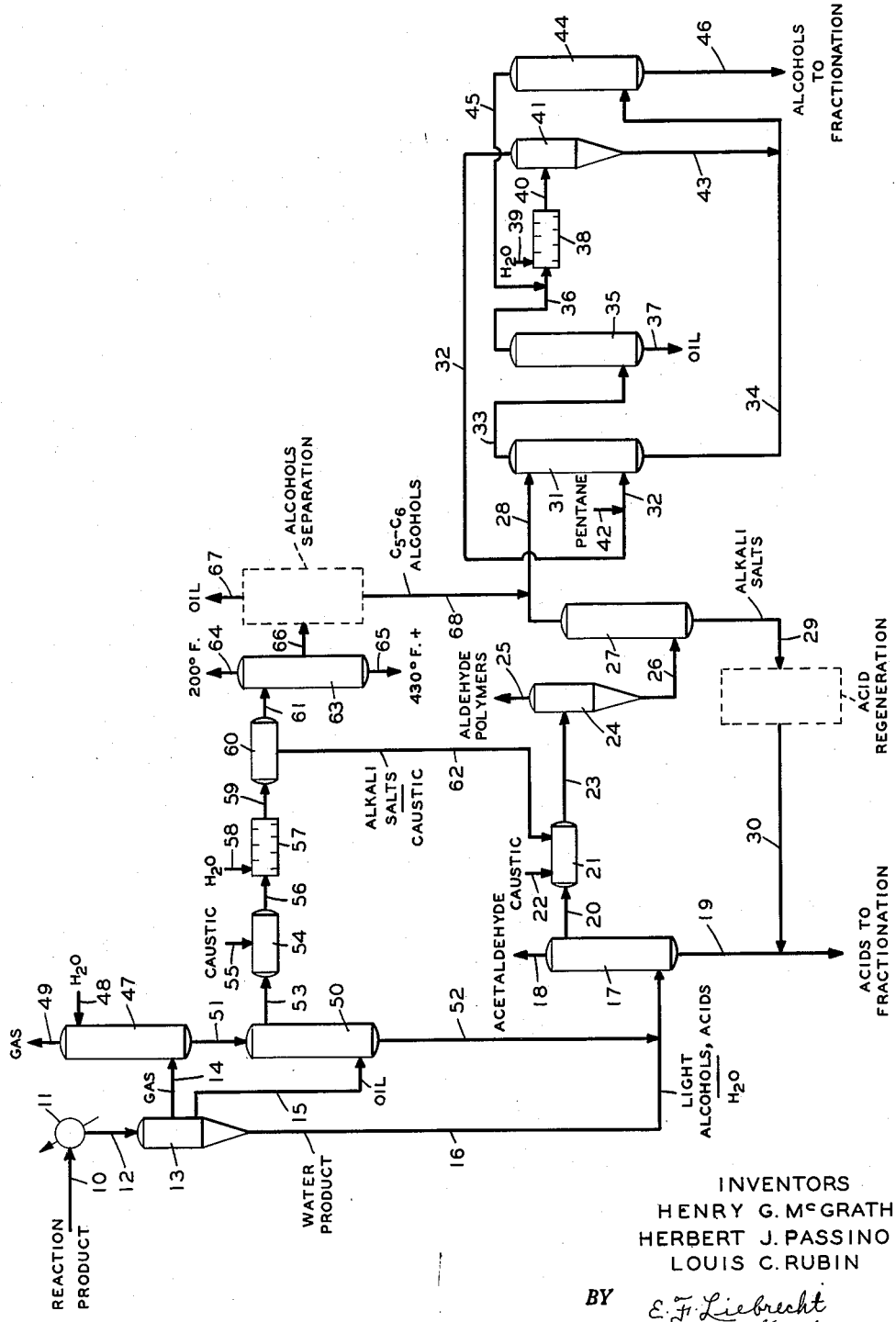

2,635,111

UNITED STATES PATENT OFFICE 2,635,111

SEPARATION OF ORGANIC COMPOUNDS

Henry G. McGrath, Elizabeth, Herbert J. Passino, Englewood, and Louis C. Rubin, West Caldwell, N. J., assignors to The M. W. Kellogg Company, Jersey City, N. J., a corporation of Delaware Application March 17, 1949, Serial No. 81,968

17 Claims. (Cl. 260—450)

This invention relates to the separation of organic compounds and relates more particularly to the separation of oxygenated organic compounds from the reaction product obtained in the catalytic hydrogenation of oxides of carbon. Still more particularly, the invention relates to an improved process for the separation of oxygenated organic compounds present in a water-product liquid phase produced from the treatment of the reaction product obtained in the catalytic hydrogenation of oxides of carbon. This application is a continuation-in-part of our prior and co-pending application Serial No. 709,872, filed November 14, 1946, now Patent No. 2,571,151, and relating to the separation of organic compounds.

It is known that hydrogen and oxides of carbon, particularly carbon monoxide, may be made to react exothermically in the presence of certain catalysts and under specific reaction conditions to form hydrocarbons, alcohols, acids and other oxygenated organic compounds which may comprise aldehydes, ketones and esters. In general, the synthesis of hydrocarbons and oxygenated organic compounds by the hydrogenation of carbon monoxide is accomplished in the presence of a metal or an oxide of a metal, such as one chosen from group VIII of the periodic table as a catalyst, at pressures below about 500 pounds per square inch gage and at temperatures below about 750° F. In order to effect the reaction of hydrogen and carbon monoxide to produce the aforementioned organic compounds, various methods are employed, among them being those known as fixed-bed and fluid-bed catalyst operations. Characteristically, certain reaction conditions are necessary for each of these processes and for the particular catalyst used. The synthesis feed gas or reaction mixture comprises a mixture of about 1:5 mols of hydrogen per mol of carbon monoxide and may be prepared by various means including the catalytic conversion of natural gas, steam and carbon dioxide. It will be understood, however, that while the hydrogenation of carbon monoxide has been referred to specifically, such above-referred hydrogenation is of wider application and includes within its scope the hydrogenation of any suitable carbon oxide.

The reaction effluent thus produced in the aforementioned hydrogenation of an oxide of carbon, comprising hydrocarbons, alcohols, acids and other oxygenated organic compounds which may include aldehydes, ketones and esters, is obtained in the vapor state in the form of reactor outlet gases. These gases are generally passed through one or more condensation zones in which they are cooled to temperatures within the range of about 40° F. and about 150° F. The resulting condensate then separates into an oil product liquid phase, a water-product liquid phase and an uncondensed gas product. The oil product liquid phase thus obtained generally comprises oil soluble organic acids and alcohols, and may also contain minor quantities of water soluble components such as relatively low boiling organic acids and alcohols. The water product liquid phase thus obtained comprises water soluble or relatively low boiling organic acids and alcohols, and may also contain minor proportions of hydrocarbons and other relatively low-boiling oxygenated organic compounds such as aldehydes, ketones or esters.

In our above-referred prior and co-pending application Serial No. 709,872, we disclosed an improved process for the treatment of the aforementioned oil product liquid phase for the separation of oxygenated organic compounds therefrom. The process of the present invention is therefore concerned with a series of novel interrelated steps in which the aforementioned water product liquid phase is either separately subjected to treatment for the separation of oxygenated organic compounds therefrom, or is treated in combination with products obtained from the prior treatment of the oil product liquid phase for the separation of oxygenated organic compounds from the aforesaid water product liquid phase.

It is, therefore, an object of the present invention to provide an improved process for the separation of oxygenated organic compounds present in the water product liquid phase obtained from the treatment of the reaction effluent produced in the hydrogenation of oxides of carbon.

Another object of the invention is to provide an improved process for the separation of organic acids, alcohols and other oxygenated organic compounds present in the water product liquid phase obtained from the treatment of the reaction effluent produced in the hydrogenation of oxides of carbon.

Other objects and advantages inherent in the invention will be apparent from the following more detailed disclosure.

The accompanying drawing illustrates diagrammatically one form of the apparatus employed and capable of carrying out one embodiment of the process of the invention. While the invention will be described in detail by reference to the embodiment illustrated in the drawing, it will be noted that it is not intended that it be limited thereto, but is capable of other embodiments which may extend beyond the scope of the apparatus illustrated. Furthermore, the distribution and circulation of liquids and vapors is illustrated in the drawing by diagrammatic representations of the apparatus employed. Valves, pumps, compressors and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, the product of the reaction of a mixture of hydrogen and an oxide of carbon, such as carbon monoxide at varying mol ratios such as 2:1, and obtained by reacting the mixture with a hydrogenation catalyst, such as a reduced iron or cobalt catalyst, is supplied through line 10. This product is in the vapor form substantially as it comes from the reactor, at a temperature varying between about 300° F. and about 700° F. and contains water, methane and higher hydrocarbons, alcohols comprising methanol and higher alcohols, $C_2$ and higher acids and may also contain aldehydes, ketones and esters depending upon the conditions of the reaction. This product is first cooled to condense substantially large quantities of normally liquid components. Conveniently, condensation may be obtained in a plurality of cooling stages which are represented diagrammatically in the drawing by condenser 11 with which line 10 connects. From condenser 11 the resulting mixture of condensate and uncondensed gases passes through line 12 to a separator 13. In the latter, uncondensed gases are withdrawn through line 14 and the condensate separates as a lower aqueous phase and an upper oil phase. Both phases thus obtained contain alcohols, acids and other oxygenated organic compounds; those oxygenated compounds of relatively lower molecular weight tend to remain in the water product liquid phase while those of relatively higher molecular weight tend to remain in the oil product liquid phase. The oil product liquid phase thus obtained is drawn off at an intermediate point from separator 13 through line 15, while the water product liquid phase is drawn off from the bottom of separator 13 through line 16. It should be noted that apparatus embodying more than one separation stage may be employed, if desired; for example primary and secondary separation stages may be introduced operating successively and respectively at temperatures of about 150° F. and about 100° F.

The aforementioned water product liquid phase withdrawn through line 16 comprises relatively low boiling organic acids, alcohols and may contain hydrocarbons in minor proportion and also other oxygenated organic compounds such as aldehydes, ketones and esters. This product is next transferred through line 16 to a distillation tower 17. In tower 17 the mixture introduced through line 16 is heated to distill overhead the lowest boiling components of the mixture, namely, the lowest boiling aldehyde components such as acetaldehyde and propionaldehyde, and which are withdrawn through line 18 for further use or treatment outside the scope of the present process. The bottoms obtained from tower 17 comprising organic acids which are the highest boiling components present in the mixture introduced into tower 17 through line 16, are withdrawn through line 19 as a product of the process and may be subjected to further treatment, such as conventional fractionation for the recovery of individual acid components, which is outside the scope of the present process.

An intermediate boiling fraction from tower 17 comprising an acetaldehyde-free distillate and/or propionaldehyde-free distillate, is transferred as a side-stream through line 20. This distillate contains relatively low boiling alcohols having from three to six carbon atoms per molecule, and may contain aldehydes higher boiling than acetaldehyde or propionaldehyde and may also contain traces of organic acids and other oxygenated organic compounds such as ketones and esters. This distillate is next treated with alkali in order to effect neutralization of traces of organic acids that may be present, and also to polymerize aldehydes and to saponify esters. For this purpose, the distillate is next transferred from tower 17 through line 20 to a caustic treater 21, in which it is intimately mixed with alkali in a suitable amount introduced through line 22. After the components of the mixture are maintained in intimate contact for a time sufficient to effect the desired neutralization of traces of organic acids present in the distillate from tower 17, withdrawn through line 20, and to effect polymerization of aldehydes and saponification of esters, the resulting mixture is withdrawn from treater 21 through line 23. The mixture thus withdrawn through line 23 comprises alcohols, alkali salts of organic acids and aldehyde polymers. This mixture is next transferred through line 23 to a separator 24. In separator 24 separation is effected between an upper phase comprising aldehyde polymers which is withdrawn through line 25, and a lower phase comprising a mixture of alcohols, alkali salts of organic acids and other oxygenated organic compounds in minor proportion which is withdrawn through line 26. The aldehyde polymers thus withdrawn through line 25 may be transferred for further use or treatment outside the scope of the present process.

The aforementioned aqueous mixture in line 26 comprising alcohols, alkali salts of organic acids and other oxygenated organic compounds in minor proportion is next transferred to a distillation tower 27. In tower 27 the mixture is heated to distill overhead alcohols present, which are withdrawn through line 28. The bottoms from tower 27, comprising an aqueous mixture of alkali salts of organic acids, are withdrawn through line 29 and may be subjected to conventional treatment with an inorganic acid in order to regenerate the corresponding organic acids from these salts. Accordingly, the aqueous mixture of alkali salts and organic acids in line 29 is transferred through this line to an acid regeneration stage as indicated in the drawing. The acids thus regenerated from the aforementioned alkali salts are withdrawn from the acid regeneration stage through line 30 and may be combined with acids withdrawn from tower 17 through line 19 in order to obtain a concentration of total acids present in the aforementioned water product liquid phase in line 16.

The overhead from tower 27 comprising a mixture of alcohols (and also other oxygenated compounds, in minor proportion, such as ketones) may also contain minor quantities of hydrocarbons which must be removed in order to effect recovery of relatively pure alcohols. It has been found that the hydrocarbons tend to concentrate as their homogenous alcohol azeotropes in the distillation cuts taken between the various alcohols. In this respect, it has been found that in such aqueous alcohol solutions contaminating hydrocarbons can be removed efficiently by means of a relatively low boiling hydrocarbon which is itself readily removable. In principle, the process may be considered as one of dilution rather than extraction in that the undesirable hydrocarbons are replaced by one or more of the aforementioned relatively low boiling hydrocarbons that may be readily eliminated. Therefore, the process has a particular application to the present process of separating oxygenated organic compounds present in the aforementioned water product liquid phase obtained from the catalytic hydrogenation of an oxide of carbon.

The aforementioned relatively low boiling hydrocarbon may be normal pentane, which is highly suitable in over-all use as applied to the aforementioned process and as evidenced by experimental laboratory data. It should be noted, however, that the operation is not restricted to the sole use of pentane for the purpose indicated, but that other lighter or heavier hydrocarbons may also be successfully employed, such as butane or heptane, provided the boiling point of the hydrocarbon treating agent selected is lower than that of the hydrocarbons to be extracted.

In order to effect removal of the aforementioned contaminating hydrocarbons, the overhead from tower 27, comprising an alcohol mixture containing minor quantities of hydrocarbons, is transferred through line 28 to an upper point in an extraction tower 31. In tower 31 the mixture introduced through line 28 is subjected to intimate countercurrent contact with pentane or other selected suitable hydrocarbon treating agent which is introduced into tower 31 at a low point through line 32. The treating agent and the aforementioned alcohol mixture containing hydrocarbons are contacted in tower 31 under conditions effective to absorb in the treating agent, the hydrocarbons present. The extract thus produced, comprising the pentane treating agent and higher hydrocarbons together with small quantities of alcohols, is withdrawn from tower 31 through line 33. The raffinate from tower 31, comprising a mixture of alcohols and small quantities of the pentane treating agent, is withdrawn through line 34 for further treatment in the process hereinafter described.

The extract from tower 31 comprising the pentane treating agent and higher hydrocarbons together with small quantities of alcohols is transferred through line 33 to a distillation tower 35. In tower 35 the aforementioned mixture is heated to distill overhead the pentane treating agent and small quantities of alcohols present as pentane-alcohol azeotropes which are withdrawn through line 36. Bottoms from tower 35 comprising higher hydrocarbons are withdrawn through line 37 for further use or treatment outside the scope of the present process.

The overheads from tower 35 comprising pentane-alcohol azeotropes are transferred through line 36 into a mixer 38, which is provided to intimately mix a relatively small amount of water with the alcohol-pentane mixture. Water thus employed is introduced into mixer 38 through line 39. The resulting mixture from mixer 38 is next transferred through line 40 to a separator 41. In separator 41, by means of settling action, an upper phase comprising pentane is withdrawn through line 32 and is recycled through this line for further use in tower 31 in the process hereinbefore described. Make-up pentane is introduced into line 32 through line 42.

Bottoms from separator 41, comprising an aqueous alcohol mixture containing small quantities of pentane, are withdrawn through line 43 and combined with the raffinate from tower 32 in line 34 which contains a mixture of alcohols and relatively minor quantities of pentane as previously described. The mixture thus combined in line 34 is next transferred into a distillation tower 44 to effect removal of the pentane treating agent from the alcohol stream. In tower 44 the mixture is heated to distill overhead pentane-alcohol azeotropes (such as pentane-methanol azeotropes) through line 45 and a pentane-free alcohol mixture withdrawn as bottoms through line 46, as a product of the process. This mixture of alcohols may be transferred to conventional fractionation apparatus if so desired, for the separation of individual alcohol components.

The overhead distillate from tower 44, comprising pentane-alcohol azeotropes is transferred through line 45 into line 36 to combine with the overhead distillate from tower 35, which also comprises pentane-light alcohol azeotropes. The combined stream is next transferred through line 36 into mixer 38 where it is water-washed for subsequent processing in the manner previously described, in order to effect subsequent recovery of the lightest alcohol component present, for example, methanol.

As previously indicated, the aforementioned water product liquid phase, in another modification of the process of the invention, may be treated in combination with products obtained from the prior treatment of the oil product liquid phase. In accordance with this modification of the process of the invention uncondensed gases from separator 13, withdrawn through line 14 may be transferred to a low point in a suitable scrubbing vessel 47. In this gas scrubber the gases are intimately contacted with water or with an aqueous solution containing oxygenated organic compounds introduced at an upper point through line 48, in order to absorb the more volatile oxygenated compounds in the water that may be present in the gases. The remaining gas, essentially free of oxygenated organic compounds and consisting essentially of relatively light hydrocarbons, is withdrawn overhead from tower 47 through line 49 for further use or treatment outside the scope of the present process.

The aforementioned oil product liquid phase, separated in separator 13 and withdrawn through line 15, is next transferred through this line to a low point in an oil scrubber 50, in which the oil is contacted intimately with water to absorb in the water the oxygenated compounds which are dissolved in the oil and are relatively more soluble in water, such as relatively low boiling alcohols, ketones and aldehydes. The water employed for this purpose conveniently may be the water employed for scrubbing in gas scrubber 47, which is transferred from scrubber 47 to the upper part of oil scrubber 50 through line 51. The scrubbing water, containing dissolved oxygenated organic compounds, is withdrawn from the bottom of oil scrubber 50 through line 52, which conveniently connects with line 16 for combining the scrubbing water with the water product liquid phase withdrawn from separator 13. The combined stream is next transferred through line 16 to tower 17 for further treatment in the process hereinbefore described.

The scrubbed oil in scrubber 50 is withdrawn from an upper portion of the scrubber through line 53. This oil may next be treated with alkali to convert organic acids contained in the oil to their corresponding alkali salts, and also to polymerize aldehydes and saponify esters. For this purpose the oil is transferred through line 53 to a caustic treater 54 in which it is intimately mixed with alkali in a suitable amount introduced through line 55. After the components of the mixture are maintained in intimate contact for a time sufficient to effect the desired neutralization, the resulting mixture is withdrawn from treater 54 through line 56. The mixture thus withdrawn through line 56 comprises alcohols, alkali salts of organic acids and excess alkali (and may also comprise other non-acid oxygenated organic compounds as originally present in the oil product liquid phase withdrawn from separator 13). In order to facilitate separation of excess alkali and alkali salts of organic acids from this mixture in line 56, the mixture is next transferred to a mixer 57 in which it is contacted with water introduced through line 58. The amount of water is limited to the minimum necessary to effect separation of the oil soluble components from excess alkali and alkali salts of organic acids, and also to dissolve any relatively low boiling alcohols that may be present, which may include butanol and lighter alcohols. The resulting aqueous mixture from mixer 57 is next transferred through line 59 to a settler 60. In settler 60 the mixture separates into an upper oil phase, which is withdrawn through line 61, and a lower aqueous phase which is withdrawn through line 62. This aqueous phase in line 62 comprises an aqueous mixture of excess alkali, alkali salts of organic acids and may also include esters, relatively low boiling alcohols and aldehyde polymers. The mixture thus obtained may next be employed, in the present modification of the process of the invention, for neutralizing the aforementioned acid containing mixture withdrawn from tower 17 through line 20, and transferred into treater 21. For this purpose the aforementioned mixture in line 62 may be transferred directly into treater 21 for further use in the process hereinbefore described.

The oil separated in settler 60 and withdrawn as an upper liquid phase through line 61 may next be transferred through this line to a fractionation tower 63. Tower 63 is provided and suitably equipped to separate the oil into several relatively narrow boiling fractions. Thus there may be separated a relatively low boiling fraction containing constituents boiling up to 200° F. and containing no alcohols boiling above butanol. This fraction may be withdrawn through line 64. This fraction is relatively free of oxygenated organic compounds and is in condition for further use or treatment outside the scope of the present process. The highest boiling fraction from tower 63 is withdrawn through line 65 as a bottoms condensate. This fraction preferably contains constituents higher boiling than about 430° F., and comprises relatively high boiling hydrocarbons and aldehydes, and may be withdrawn through line 65 for further use or treatment outside the scope of the present process. An intermediate boiling fraction from tower 63 boiling between about 200° F. and 430° F. may be withdrawn through line 66. This fraction contains in addition to hydrocarbons, alcohols having five or six carbon atoms per molecule, and may be next transferred, as indicated in the drawing to an alcohol separation stage. The oil thus separated in this separation stage may be withdrawn through line 67 for further use or treatment outside the scope of the present process; while alcohols thus separated are withdrawn from this stage through line 68 and may be transferred directly into line 28, with which line 68 connects, for further treatment in tower 31 as hereinbefore described, in order to remove any hydrocarbon impurities that may be present in the alcohol mixture in line 68. While a particular intermediate boiling oil fraction has been indicated as being withdrawn from tower 63 through line 67, it will be understood of course, that any intermediate boiling fraction within the range from about 200° F. and 430° F. may also be withdrawn from this tower and subjected to similar treatment in the process indicated above.

Having thus described our invention, we claim:

1. A process for recovering organic acids and alcohols contained in a water product liquid phase obtained from the treatment of the reaction product produced in the catalytic hydrogenation of oxides of carbon, said water product liquid phase containing hydrocarbons in minor proportion, which comprises: distilling said water product liquid phase to obtain a relatively high boiling fraction comprising organic acids and a relatively low boiling fraction comprising alcohols and hydrocarbons; subjecting said relatively low boiling fraction to solvent extraction with a relatively low boiling hydrocarbon to produce an extract phase comprising hydrocarbons and a raffinate phase comprising alcohols; and separating the phases thus produced.

2. A process for recovering organic acids and alcohols contained in a water product liquid phase obtained from the treatment of the reaction product produced in the catalytic hydrogenation of oxides of carbon, said water product liquid phase containing hydrocarbons in minor proportion, which comprises: distilling said water product liquid phase to obtain a relatively high boiling fraction comprising organic acids and a relatively low boiling fraction comprising alcohols, organic acids and hydrocarbons; neutralizing said relatively low boiling fraction to obtain a mixture comprising alcohols, alkali salts of organic acids and hydrocarbons; separating alkali salts from said mixture; subjecting the remainder of said mixture to solvent extraction with a relatively low boiling hydrocarbon to produce an extract phase comprising hydrocarbons and a raffinate phase comprising alcohols; and separating the phases thus produced.

3. A process for recovering organic acids and alcohols contained in a water product liquid phase obtained from the treatment of the reaction product produced in the catalytic hydrogenation of oxides of carbon, said water product liquid phase containing hydrocarbons in minor proportion and aldehydes, which comprises: distilling said water product liquid phase to obtain a relatively high boiling fraction comprising organic acids and a relatively low boiling fraction comprising alcohols, organic acids, aldehydes and hydrocarbons; contacting said relatively low boiling fraction with alkali in an amount sufficient to obtain a mixture comprising alcohols, alkali salts of organic acids, aldehyde polymers and hydrocarbons; separating aldehyde polymers and alkali salts from said mixture; subjecting the remainder of said mixture to solvent extraction with a relatively low boiling hydrocarbon to produce an extract phase comprising hydrocarbons and a raffinate phase comprising alcohols; and separating the phases thus produced.

4. In a process for the catalytic hydrogenation of oxides of carbon to produce organic compounds in which the reaction product therefrom is treated to form an oil product liquid phase and a water product liquid phase, each of said phases containing organic acids and alcohols, the method for recovering organic acids and alcohols from said water product liquid phase, which comprises: distilling said water product liquid phase to obtain a relatively high boiling fraction comprising organic acids and a relatively low boiling fraction comprising alcohols and organic acids; neutralizing at least a portion of said oil product liquid phase to obtain a mixture comprising alcohols, alkali salts of organic acids and excess alkali; separating alkali salts and excess alkali from the mixture thus obtained; neutralizing said relatively low boiling fraction with said separated alkali salts and excess alkali to obtain a mixture comprising alcohols and alkali salts of organic acids; and separating alcohols from alkali salts in the mixture thus produced.

5. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing hydrocarbons in minor proportion, the method for recovering organic acids and alcohols from said water product liquid phase, which comprises: distilling said water product liquid phase to obtain a relatively high boiling fraction comprising organic acids and a relatively low boiling fraction comprising alcohols, organic acids and hydrocarbons; neutralizing at least a portion of said oil product liquid phase to obtain a mixture comprising alcohols, alkali salts of organic acids and excess alkali; separating alkali salts and excess alkali from the mixture thus obtained; neutralizing said relatively low boiling fraction with said separated alkali salts and excess alkali to obtain a mixture comprising alcohols, alkali salts of organic acids and hydrocarbons; separating alkali salts from the mixture thus produced; subjecting the remainder of said mixture to solvent extraction with a relatively low boiling hydrocarbon to produce an extract phase comprising hydrocarbons and a raffinate phase comprising alcohols; and separating the phases thus produced.

6. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing aldehydes as additional components, the method for recovering organic acids and alcohols from said water product liquid phase, which comprises: distilling said water product liquid phase to obtain a relatively high boiling fraction comprising organic acids and a relatively low boiling fraction comprising alcohols, organic acids and aldehydes; neutralizing at least a portion of said oil product liquid phase to obtain a mixture comprising alcohols, alkali salts of organic acids and excess alkali; separating alkali salts and excess alkali from the mixture thus obtained; contacting said relatively low boiling fraction with said separated alkali salts and excess alkali in an amount sufficient to obtain a mixture comprising alcohols, alkali salts of organic acids and aldehyde polymers; and separating alcohols from alkali salts and aldehyde polymers in the mixture thus produced.

7. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing hydrocarbons in minor proportion and aldehydes, the method for recovering organic acids and alcohols from said water product liquid phase, which comprises: distilling said water product liquid phase to obtain a relatively high boiling fraction comprising organic acids and a relatively low boiling fraction comprising alcohols, organic acids, aldehydes and hydrocarbons; neutralizing at least a portion of said oil product liquid phase to obtain a mixture comprising alcohols, alkali salts of organic acids and excess alkali; separating alkali salts and excess alkali from the mixture thus obtained; contacting said relatively low boiling fraction with said separated alkali salts and excess alkali in an amount sufficient to obtain a mixture comprising alcohols, alkali salts of organic acids, aldehyde polymers and hydrocarbons; separating alkali salts and aldehyde polymers from the mixture thus produced; subjecting the remainder of said mixture to solvent extraction with a relatively low boiling hydrocarbon to produce an extract phase comprising hydrocarbons and a raffinate phase comprising alcohols; and separating the phases thus produced.

8. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing hydrocarbons in minor proportion, the method for recovering organic acids and alcohols from said reaction product which comprises: water-washing at least a portion of said oil product liquid phase to obtain a mixture of hydrocarbons and water containing dissolved organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols and hydrocarbons; subjecting said relatively low boiling fraction to solvent extraction with a relatively low boiling hydrocarbon to produce an extract phase comprising hydrocarbons and a raffinate phase comprising alcohols; and separating the phases thus produced.

9. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing hydrocarbons in minor proportion, the method for recovering organic acids and alcohols from said reaction product which comprises: water-washing at least a portion of said oil product liquid phase to obtain a mixture of hydrocarbons and water containing dissolved organic acids and alcohols; separating said mixture from said oil product liquid phase; comibning the mixture thus separated with said water product liquid phase; distilling the resulting mixture to obtain a relatively high boiling fraction comprising organic acids and a relatively low boiling fraction comprising alcohols, organic acids and hydrocarbons; neutralizing said relatively low boiling fraction to obtain a mixture comprising alcohols, alkali salts of organic acids and hydrocarbons; separating alkali salts from said mixture; subjecting the remainder of said mixture to solvent extraction with a relatively low boiling hydrocarbon to produce an extract phase comprising hydrocarbons and a raffinate phase comprising alcohols; and separating the phases thus produced.

10. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing hydrocarbons in minor proportion and aldehydes, the method for recovering organic acids and alcohols from said reaction product which comprises: water-washing at least a portion of said oil product liquid phase to obtain a mixture of hydrocarbons and water containing dissolved organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols, organic acids, aldehydes and hydrocarbons; contacting said relatively low boiling fraction with alkali in an amount sufficient to obtain a mixture comprising alcohols, alkali salts of organic acids, aldehyde polymers and hydrocarbons; separating alkali salts and aldehyde polymers from said mixture; subjecting the remainder of said mixture to solvent extraction with a relatively low boiling hydrocarbon to produce an extract phase comprising hydrocarbons and a raffinate phase comprising alcohols; and separating the phases thus produced.

11. In a process for the catalytic hydrogenation of oxides of carbon to produce organic compounds in which the reaction product therefrom is treated to form an oil product liquid phase and a water product liquid phase, each of said phases containing organic acids and alcohols, the method for recovering organic acids and alcohols from said reaction product which comprises: water-washing at least a portion of said oil product liquid phase to obtain a mixture comprising organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols and organic acids; neutralizing at least a portion of said water-washed oil product liquid phase to obtain a mixture comprising alcohols, alkali salts of organic acids and excess alkali; separating alkali salts and excess alkali from the mixture thus obtained; neutralizing said relatively low boiling fraction with said separated alkali salts and excess alkali to obtain a mixture comprising alcohols and alkali salts of organic acids; and separating alcohols from alkali salts in the mixture thus produced.

12. In a process for the catalytic hydrogenation of oxides of carbon to produce organic compounds in which the reaction product therefrom is treated to form an oil product liquid phase and a water product liquid phase, each of said phases containing organic acids and alcohols and said water-product liquid phase containing hydrocarbons in minor proportion, the method for recovering organic acids and alcohols from said reaction product which comprises: water-washing at least a portion of said oil product liquid phase to obtain a mixture of hydrocarbons and water containing dissolved organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols, organic acids and hydrocarbons; neutralizing at least a portion of said water-washed oil product liquid phase to obtain a mixture comprising alcohols, alkali salts of organic acids and excess alkali; separating alkali salts and excess alkali from the mixture thus obtained; neutralizing said relatively low boiling fraction with said separated alkali salts and excess alkali to obtain a mixture comprising alcohols, alkali salts of organic acids and hydrocarbons; separating alkali salts from the mixture thus produced; subjecting the remainder of said mixture to solvent extraction with a relatively low boiling hydrocarbon to produce an extract phase comprising hydrocarbons and a raffinate phase comprising alcohols; and separating the phases thus produced.

13. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing aldehydes as additional components, the method for recovering organic acids and alcohols from said reaction product which comprises: water-washing at least a portion of said oil product liquid phase to obtain a mixture comprising organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols, organic acids and aldehydes; neutralizing at least a portion of said water-washed oil product liquid phase to obtain a mixture comprising alcohols, alkali salts of organic acids and excess alkali; separating alkali salts and excess alkali from the mixture thus obtained; contacting said relatively low boiling fraction with said separated alkali salts and excess alkali in an amount sufficient to obtain a mixture comprising alcohols, alkali salts of organic acids and aldehyde polymers; and separating alcohols from alkali salts and aldehyde polymers in the mixture thus produced.

14. In a process for the catalytic hydrogenation of oxides of carbon to produce organic compounds in which the reaction product therefrom is treated to form an oil product liquid phase and a water product liquid phase, each of said phases containing organic acids and alcohols and said water-product liquid phase containing hydrocarbons in minor proportion and aldehydes, the method for recovering organic acids and alcohols from said reaction product which comprises: water-washing at least a portion of said oil product liquid phase to obtain a mixture comprising organic acids and alcohols; separating said mixture from said oil product liquid phase; combining the mixture thus separated with said water product liquid phase; distilling the resulting mixture to obtain a relatively high boiling fraction comprising organic acids and a relatively low boiling fraction comprising alcohols, organic acids, aldehydes and hydrocarbons; neutralizing at least a portion of said water-washed oil product liquid phase to obtain a mixture comprising alcohols, alkali salts of organic acids and excess alkali; separating alkali salts and excess alkali from the mixture thus obtained; contacting said relatively low boiling fraction with said separated alkali salts and excess alkali in an amount sufficient to obtain a mixture comprising alcohols, alkali salts of organic acids, aldehyde polymers and hydrocarbons; separating alkali salts and aldehyde polymers from the mixture thus produced; subjecting the remainder of said mixture to solvent extraction with a relatively low boiling hydrocarbon to produce an extract phase comprising hydrocarbons and a raffinate phase comprising alcohols; and separating the phases thus produced.

15. In a process for the catalytic hydrogenation of oxides of carbon to produce organic compounds in which the reaction product therefrom is treated to form an oil product liquid phase and a water product liquid phase, each of said phases containing organic acids and alcohols, the method for recovering organic acids and alcohols from said reaction product which comprises: water-washing at least a portion of said oil product liquid phase to obtain a mixture of hydrocarbons and water containing dissolved organic acids and alcohols; separating said mixture from said oil product liquid phase; combining the mixture thus separated with said water product liquid phase; distilling the resulting mixture to obtain a relatively high-boiling fraction comprising organic acids and a relatively low-boiling fraction comprising alcohols and hydrocarbons; subjecting said relatively low-boiling fraction to solvent extract with a relatively low-boiling hydrocarbon to produce an extract phase comprising hydrocarbons and a raffinate phase comprising alcohols; and separating the phases thus produced.

16. In a process for the catalytic hydrogenation of oxides of carbon to produce organic compounds in which the reaction product therefrom is treated to form an oil product liquid phase and a water product liquid phase, each of said phases containing organic acids and alcohols, the method for recovering organic acids and alcohols from said reaction product which comprises: water-washing at least a portion of said oil product liquid phase to obtain a mixture comprising organic acids and alcohols; separating said mixture from said oil product liquid phase; combining the mixture thus separated with said water product liquid phase; and distilling the resulting mixture to obtain a relatively high-boiling fraction comprising organic acids and a relatively low-boiling fraction comprising alcohols.

17. In a process for the catalytic hydrogenation of oxides of carbon to produce organic compounds in which the reaction product therefrom is treated to form an oil product liquid phase and a water product liquid phase, each of said phases containing organic acids and alcohols and said water product liquid phase containing aldehydes, the method for recovering organic acids and alcohols from said reaction product which comprises: water-washing at least a portion of said oil product liquid phase to obtain a mixture comprising organic acids and alcohols; separating said mixture from said oil product liquid phase; combining the mixture thus separated with said water product liquid phase; distilling the resulting mixture to obtain a relatively high boiling fraction comprising organic acids and a relatively low-boiling fraction comprising alcohols, organic acids and aldehydes; contacting said relatively low-boiling fraction with alkali in an amount sufficient to obtain a mixture comprising alcohols, alkali salts of organic acids and aldehyde polymers; and separating alkali salts and aldehyde polymers from said mixture.

HENRY G. McGRATH.
HERBERT J. PASSINO.
LOUIS C. RUBIN.

References Cited in the file of this patent

UNITED STATES PATENTS

| Number | Name | Date |
|---|---|---|
| 2,274,750 | Soenksen et al. | Mar. 3, 1942 |
| 2,288,769 | Alleman et al. | July 7, 1942 |
| 2,476,788 | White | July 19, 1949 |
| 2,519,127 | Lauer et al. | July 25, 1950 |
| 2,533,675 | Marschner | Dec. 12, 1950 |